United States Patent
Niesen et al.

(10) Patent No.: US 11,708,852 B2
(45) Date of Patent: Jul. 25, 2023

(54) BALL JOINT, METHOD OF MANUFACTURING A BALL JOINT, AND TOOL FOR MANUFACTURING A BALL JOINT

(71) Applicant: FEDERAL-MOGUL MOTORPARTS LLC, Southfield, MI (US)

(72) Inventors: Stephanie N. Niesen, St. Louis, MO (US); Rachael Raines, St. Charles, MO (US); Glen C. Parker, St. Peters, MO (US); Dustin Schrieber, Waterloo, IL (US)

(73) Assignee: FEDERAL-MOGUL MOTORSPOTS LLC, Southfield, MI (US)

( * ) Notice: Subject to any disclaimer, the term of this patent is extended or adjusted under 35 U.S.C. 154(b) by 124 days.

(21) Appl. No.: 17/359,595

(22) Filed: Jun. 27, 2021

(65) Prior Publication Data

US 2022/0412400 A1    Dec. 29, 2022

(51) Int. Cl.
    *F16C 11/06*      (2006.01)

(52) U.S. Cl.
    CPC ........ *F16C 11/0666* (2013.01); *F16C 11/068* (2013.01); *F16C 11/0685* (2013.01)

(58) Field of Classification Search
    CPC ..... F16C 11/06; F16C 11/068; F16C 11/0685; F16C 11/0642; F16C 11/069; B23P 11/00; B23P 11/005; Y10T 29/49853; Y10T 29/53996; Y10T 29/49938
See application file for complete search history.

(56) References Cited

U.S. PATENT DOCUMENTS

| | | | |
|---|---|---|---|
| 3,656,221 A | | 4/1972 | Scheublein, Jr. et al. |
| 4,875,794 A | * | 10/1989 | Kern, Jr. ............... F16C 11/086 29/898.044 |
| 5,067,841 A | * | 11/1991 | Fukukawa .......... F16C 11/0685 403/138 |
| 6,030,141 A | | 2/2000 | Lieber et al. |
| 6,042,293 A | | 3/2000 | Maughan |

(Continued)

FOREIGN PATENT DOCUMENTS

| | | |
|---|---|---|
| CA | 2287109 A1 | 4/2000 |
| FR | 924925 A | 8/1947 |

(Continued)

OTHER PUBLICATIONS

Extended Search report issued by the European Patent Office for application 22 168 761.9 dated Oct. 12, 2022; 9 pages.

*Primary Examiner* — Daniel J Wiley
(74) *Attorney, Agent, or Firm* — Reising Ethington, P.C.

(57) ABSTRACT

A ball joint includes a cover plate with a nested portion along an outer perimeter having a nested portion thickness, a domed portion located radially inward of the outer perimeter having a domed portion thickness, and a pressed portion located between the nested portion and the domed portion having a pressed portion thickness. The pressed portion thickness is less than the domed portion thickness, which during manufacture, is formed when the cover plate and bearing are simultaneously pressed into their final form and position. A tool can be used to press the cover plate and bearing in a single operation. The tool can have interchangeable components, allowing for the manufacture of differently sized ball joints.

16 Claims, 4 Drawing Sheets

(56) References Cited

U.S. PATENT DOCUMENTS

| | | | |
|---|---|---|---|
| 6,082,923 A | 7/2000 | Maughan | |
| 6,125,541 A * | 10/2000 | Parker | B23P 11/005 |
| | | | 29/446 |
| 6,202,280 B1 * | 3/2001 | Parker | F16C 11/0642 |
| | | | 29/441.1 |
| 6,532,665 B2 | 3/2003 | Parker | |
| 6,561,716 B1 * | 5/2003 | Suzuki | F16C 11/0685 |
| | | | 403/131 |
| 6,619,873 B2 | 9/2003 | Parker | |
| 7,421,785 B2 * | 9/2008 | Spence | F16C 11/0642 |
| | | | 403/135 |
| 11,504,833 B2 * | 11/2022 | Parris | B25B 27/062 |
| 2002/0129482 A1 * | 9/2002 | Parker | F16C 11/0685 |
| | | | 29/441.1 |
| 2003/0044227 A1 * | 3/2003 | Parker | F16C 11/086 |
| | | | 403/135 |
| 2005/0235476 A1 * | 10/2005 | Spence | F16C 11/0609 |
| | | | 29/451 |
| 2016/0177998 A1 * | 6/2016 | Karpman | F16C 11/0685 |
| | | | 403/135 |
| 2019/0128319 A1 | 5/2019 | Paerewyck et al. | |
| 2020/0018347 A1 * | 1/2020 | Parker | F16C 11/069 |

FOREIGN PATENT DOCUMENTS

| | | |
|---|---|---|
| JP | 3336155 B2 | 10/2002 |
| JP | 5975531 B2 | 8/2016 |
| KR | 100834211 B1 | 5/2008 |
| WO | WO2005105337 A1 | 11/2005 |
| WO | WO2009143304 A2 | 11/2009 |

\* cited by examiner

BALL JOINT, METHOD OF
MANUFACTURING A BALL JOINT, AND
TOOL FOR MANUFACTURING A BALL
JOINT

TECHNICAL FIELD

This invention generally relates to vehicle components and, in particular, to ball joints used in steering and suspension systems.

BACKGROUND

Current press tools for ball joints typically only deform and seat the cover plate, which requires the internal bearing to already be seated in place before pressing the cover plate. Accordingly, current assembly processes require multiple different pressing operations. By seating the bearing while pressing and seating the cover plate, manufacturing can be streamlined, and the internal components of the ball joint may be more conformally aligned.

SUMMARY

According to one embodiment, there is provided a ball joint comprising a ball, a stud extending from the ball, a bearing at least partially surrounding the ball, a housing at least partially surrounding the bearing, and a cover plate at least partially nested into the housing. The cover plate includes a nested portion along an outer perimeter having a nested portion thickness, a domed portion located radially inward of the outer perimeter having a domed portion thickness, and a pressed portion located between the nested portion and the domed portion having a pressed portion thickness. The pressed portion thickness is less than the domed portion thickness.

In some embodiments, the pressed portion thickness is less than the nested portion thickness.

In some embodiments, the domed portion includes a center dome area and a transition area, with the transition area being located adjacent the pressed portion.

In some embodiments, a sloping transition wall is located in the transition area.

In some embodiments, at least a portion of the sloping transition wall directly opposes an inner lip of the housing.

In some embodiments, a radially extending width of the pressed portion is equal to or less than a radially extending width of the bearing.

In some embodiments, the nested portion is seated within a radial groove in an internal bore of the housing.

In accordance with another embodiment, there is provided a method of manufacturing a ball joint, comprising the step of seating a bearing in place by pressing on an outer edge of a cover plate.

In some embodiments, the method includes the step of pressing a pin punch to retain a grease hole.

In some embodiments, the method includes the step of pressing a domed portion of the cover plate after seating the bearing.

In accordance with another embodiment, there is provided a tool for manufacturing a ball joint. The tool includes a center punch and a bearing seat having a projecting press extension that axially extends from a distal end of the tool. The bearing seat at least partially surrounds the center punch.

In some embodiments, a pin punch is at least partially surrounded by the center punch.

In some embodiments, the pin punch is configured to accommodate a grease hole.

In some embodiments, the tool includes a casing at least partially surrounding the center punch.

In some embodiments, there is a second bearing seat having a radially expanded projecting press extension, where the bearing seat and the second bearing seat are removably interchangeable with respect to the casing.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The ball joint, tooling, and manufacturing methods described herein provide for an improved structure while simultaneously seating the bearing and the cover plate in one press operation. This can streamline manufacturing by allowing for a faster, single-stop assembly process. Moreover, given the gained efficiency from manufacturing, production costs can be lowered and automated systems can be easier to implement. The tooling and methods described herein can improve throughput, with or without automation, which cuts down on labor time per unit to assemble, thus reducing labor costs. Moreover, the tooling and manufacturing methods can allow for all of the assembly components to be dropped into the housing freely prior to the closing process. Using a more controlled force with a one-step pressing tool gives the possibility to create more consistently produced parts and improve the seating of internal components. For example, the improved interference fit with the cover plate and the bearing can help with radial control during operation of the ball joint.

Figure 1:
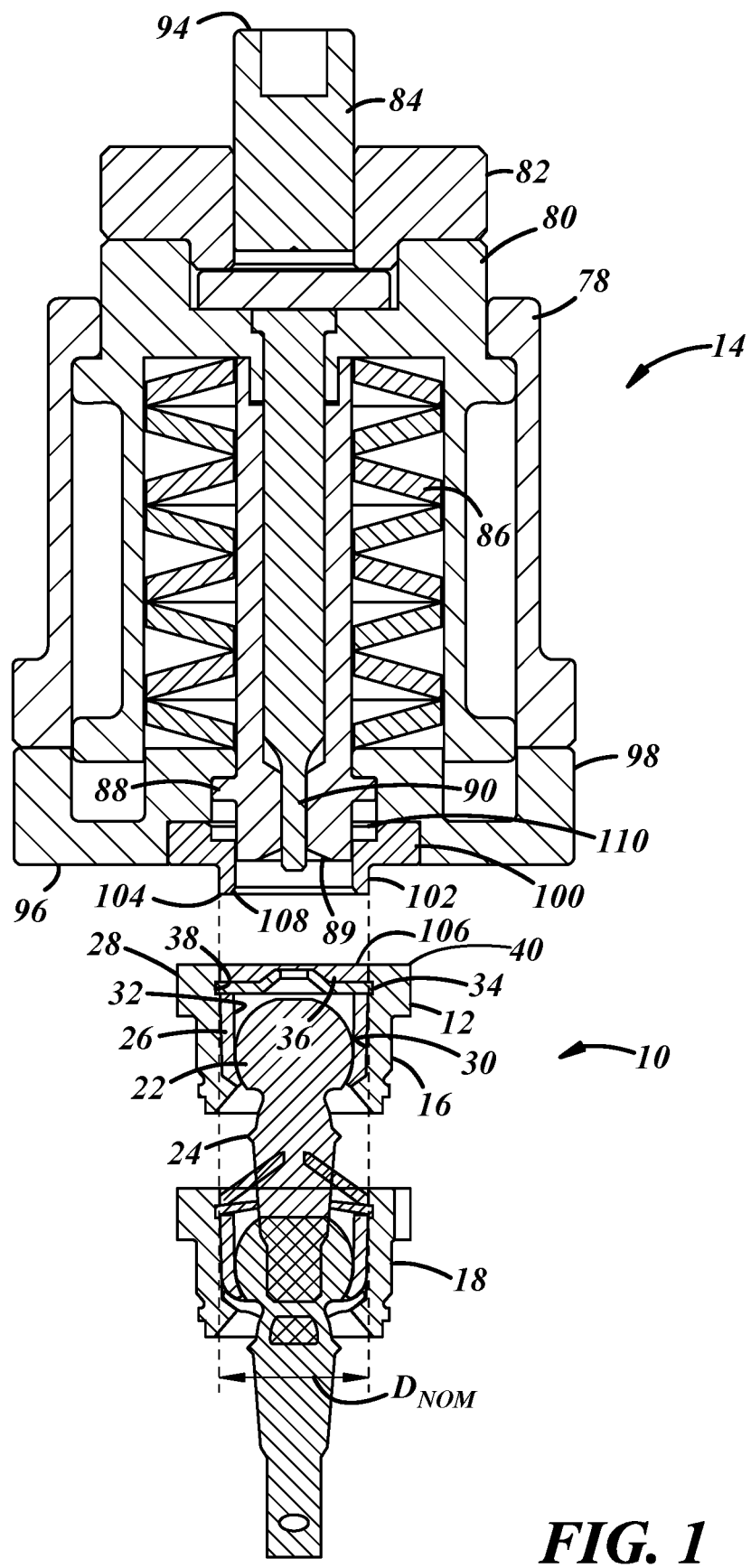
FIG. 1 is a cross-section view of a tool for manufacturing a ball joint and a ball joint that is part of a suspension component, according to one embodiment.

FIG. 1 illustrates one embodiment of a suspension component 10 and a ball joint 12 that is pressed by the tool 14, with the lower ball joint 18 before being pressed by the tool 14. An example suspension component 10 includes the ball joint 12 attached to a spring, such as a stack of Belleville washers. However, it is possible to manufacture alternately configured suspension and/or steering components in accordance with the teachings herein. For example, the ball joint 12 may include any moveable socket configuration and is not limited to the explicitly illustrated ball joints shown in the figures and described herein. The ball joint 12 may be tension loaded, cartridge or flange mounted, or integral with the control arm, to cite a few examples. Further, the ball joint 12 may be used as a tie rod end, although other vehicle-based implementations are certainly possible. The ball joint 12 may also include other features beyond what is illustrated, such as a dust boot or other operational-based features depending on the desired use and placement of the joint.

The ball joint 12 includes a ball 22 and a stud 24 extending from the ball 22. A bearing 26 at least partially surrounds the ball 22, and a housing 28 at least partially surrounds the bearing. During manufacture, the bearing 26 is placed within an internal bore 30 of the housing 28, and the ball 22 rests inside an internal bore 32 of the bearing. A pressure plate 34 is situated within the internal bore 30 of the housing 28, and then topped with a cover plate 36, which is ultimately pressed in place by the tool 14 to enclose the ball joint 12. The radially extending bearing 26 and/or housing 28 can include various threads, grooves, projecting portions, etc., such as the radial groove 38 for seating the cover plate 36, and the tool 14 can be used with a number of differently configured designs to seat the cover plate in the radial groove 38. The various subcomponents of the tool 14 are described in further detail later with respect to FIGS. 4 and 5, but FIG. 1 shows the bearing 26 and the cover plate 36 before they are fully pressed into place in the ball joint 18.

Figure 2:
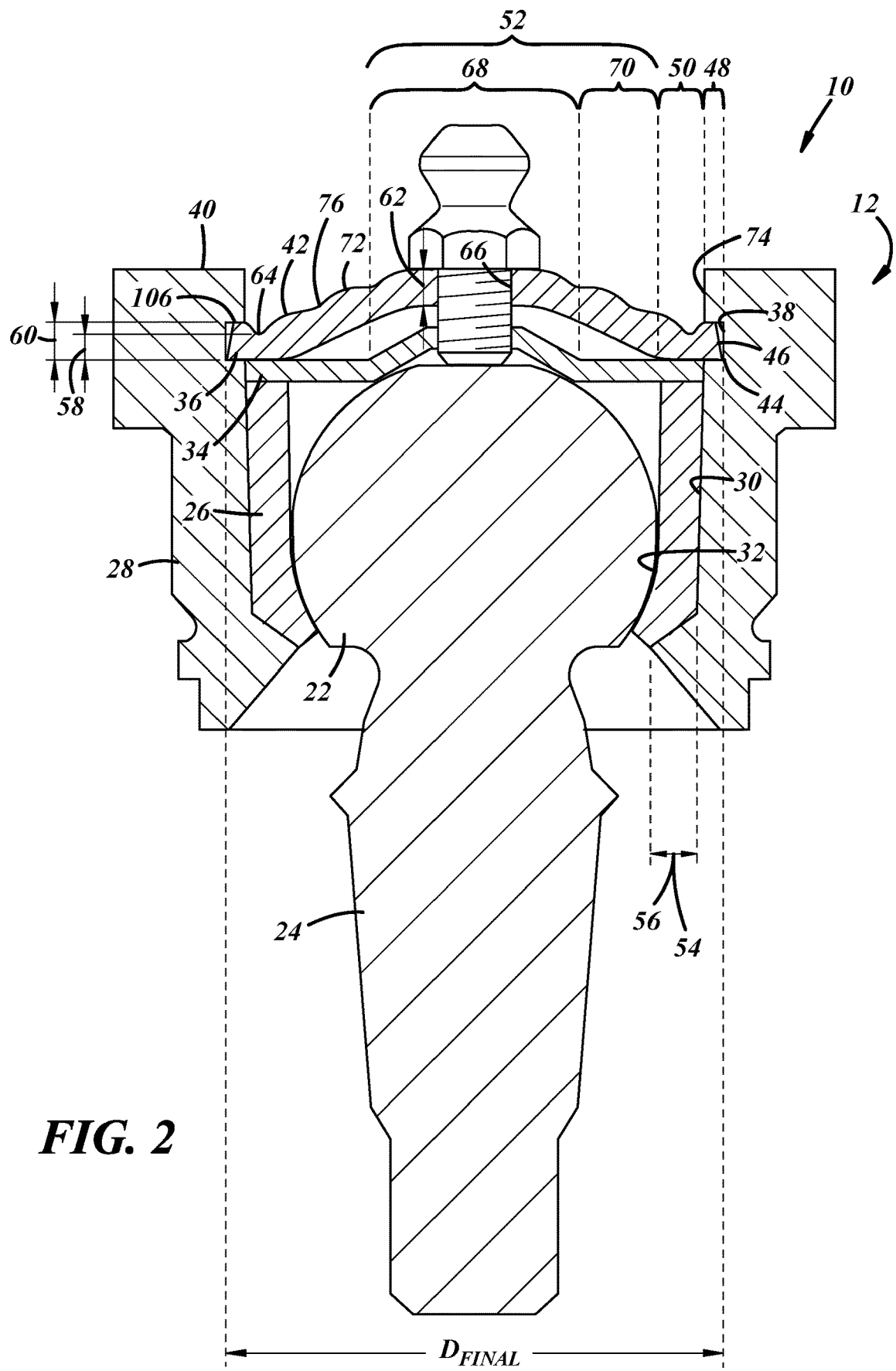
FIG. 2 is a cross-section view of a ball joint according to one embodiment.

FIG. 2 illustrates the fully pressed ball joint 12 having a seated bearing 26 and formed cover plate 36. The one-press operation to seat the bearing 26 and form the cover plate 36 can create a better conformal relationship between strategic areas of the cover plate 36 and the bearing 26, which can also improve radial control of the ball 22 and stud 34 assembly. In one example, the bearing 26 is made of a carbon fiber reinforced polyamide material to help decrease friction and increase durability, but other materials are certainly possible. Proper nesting of the bearing 26 into the internal bore 30 of the housing 28 can be accomplished by creating various pressed zones in the cover plate 36.

The cover plate 36 encapsulates an end 40 of the housing 28 and serves to encase the ball 22 and bearing 26 within the internal bore 30. With reference to FIG. 1, the cover plate 36, before pressing, has a nominal diameter $D_{NOM}$ that allows for an interference fit with the internal bore 30 of the housing 28. Upon pressing, as shown in FIG. 2, the cover plate 36 is radially expanded to its final diameter $D_{FINAL}$, which corresponds to the diameter of the internal bore 30 at the base of the radial groove 38. The pressing operation creates a domed profile 42 with various features that enhance the conformal relationship of the cover plate 36 and the bearing 26 with respect to the housing 28.

Figure 3:
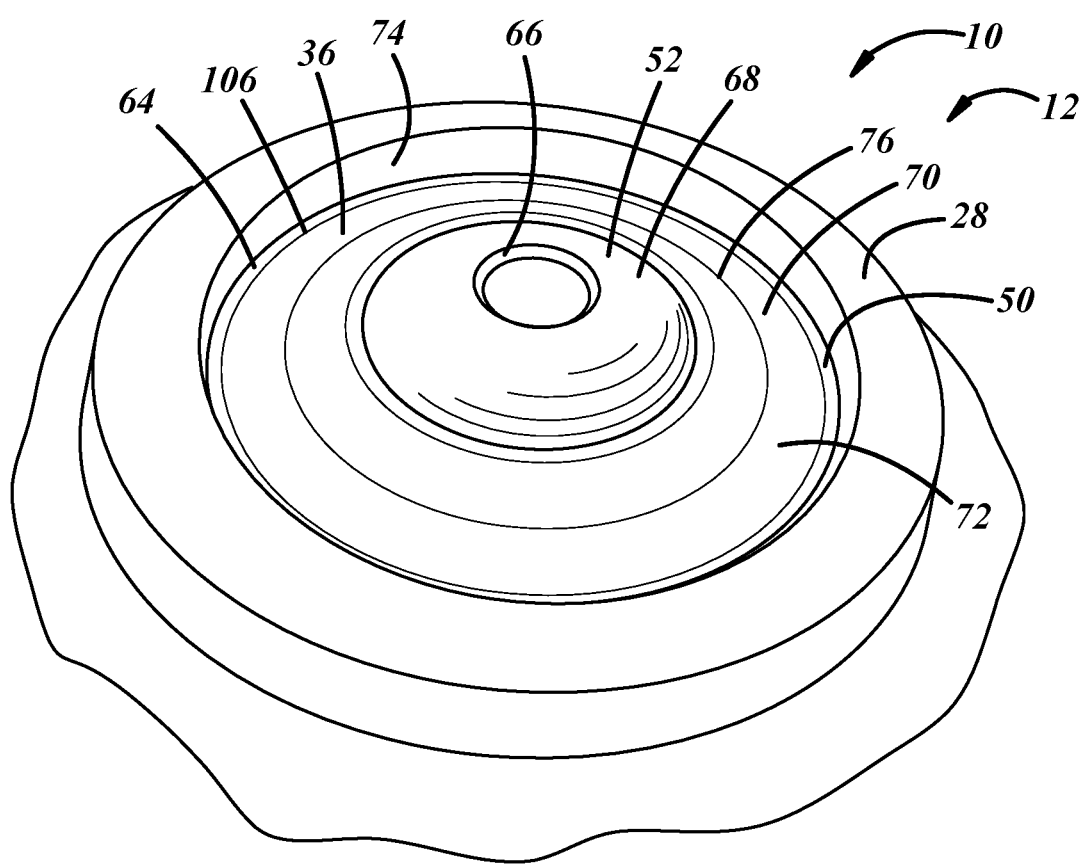
FIG. 3 is a top view of the cover plate of the ball joint of FIG. 2.

The domed profile 42 of the cover plate 36 is schematically illustrated in FIGS. 2 and 3, and includes various thickness variations that help promote nesting and proper installation of the internal components, such as the bearing 26. The outer perimeter 44 of the cover plate 36 includes a sheared edge 46 that is nested into the radial groove 38. The entire portion of the cover plate 36 that is nested within the radial groove 38 constitutes the nested portion 48 of the cover plate 36. Accordingly, the radially extending width of the nested portion 48 extends from the inner end of the radial groove 38 to the main surface of the internal bore 30 of the housing 28 and is equal to the depth of the groove 38. The nested portion 48 of the cover plate 36 includes the outer perimeter 44 and the sheared edge 46, and then a pressed portion 50 is located directly radially inward of the nested portion 48. The pressed portion 50 is located between the nested portion 48 and a domed portion 52. The pressed portion 50 has a radially extending width 54, in the illustrated embodiment, that coincides with the radially extending width 56 of the bearing 26. Matching the radially extending widths 54, 56 of the pressed portion 50 and the bearing 26 can help with seating and accurate internal positioning of the bearing when pressing the cover plate 36. The domed portion 52 makes up the center area of the cover plate 36, and the domed portion is located directly radially inward of the pressed portion 50. The domed portion 52 may have a conical or dome-like shape, or it may have a more planar shape that is stepped up from the pressed portion 50.

The pressed portion 50 includes a pressed portion thickness 58 that is smaller than both the nested portion thickness 60 and the domed portion thickness 62. In some embodiments, however, the nested portion thickness 60 might be less than the pressed portion thickness 58. The actual values of each respective thickness 58, 60, 62 will depend on the design specifications and desired use for the ball joint 12, but the relationship between each of the thicknesses (particularly between the pressed portion thickness 58 and the domed portion thickness 62) can help impart better structural placement of the other subcomponents of the joint, such as the bearing 26. The pressed portion thickness 58 is advantageously measured at the lowest point or nadir 64 of the pressed portion 50. However, because of the sheared edge 46 that occurs during the pressing process, it is advantageous to measure the nested portion thickness 60 at its greatest point, which generally coincides with the height of the radial groove 38. The domed portion thickness 62, to make for more consistent measuring and a better comparison between the pressed portion 50 and the domed portion 52, can be taken at its smallest axially extending thickness location along the entirety of the domed portion 52. In an advantageous embodiment, the domed portion thickness 62 coincides with or matches the height or thickness of the grease hole 66 at the center of the cover plate 36.

In the illustrated embodiments, with particular reference to FIG. 3 the domed portion 52 includes a center dome area 68, which is raised with respect to a transition area 70 that extends between the center dome area and the pressed portion 50. The transition area 70 includes a sloping transition wall 72 which forms a graded or sloped transition between the center dome area 68, which surrounds the grease hole 66, and the pressed portion 50. With this structure, a portion of the sloped transition wall 72 directly opposes and directly faces the inner lip 74 of the housing 28. This arrangement can help with axial positioning of the grease hole 66 and create a more compact structure as a portion of the cover plate 36 is nested within the housing 28. The transition area 70 further includes a crease 76 subdividing the sloping transition wall 72, which may be formed while pressing the cover plate 36.

To press the cover plate 36 into place and create the domed profile 42, while simultaneously seating the bearing 26, the tool 14 can be used. Typically, seating the bearing 26 requires a separate processing or pressing step. After the bearing is seated, a separate tool is used to press the cover plate 36. However, with the presently disclosed manufacturing method and tool 14, seating the bearing 26 and pressing the cover plate 36 into its correct configuration and placement can occur in one operational pressing step with a single tool. This can enhance production efficiency, lower cost, and help with more consistent seating of the internal components of the joint 12, such as the bearing 26.

Figure 4:
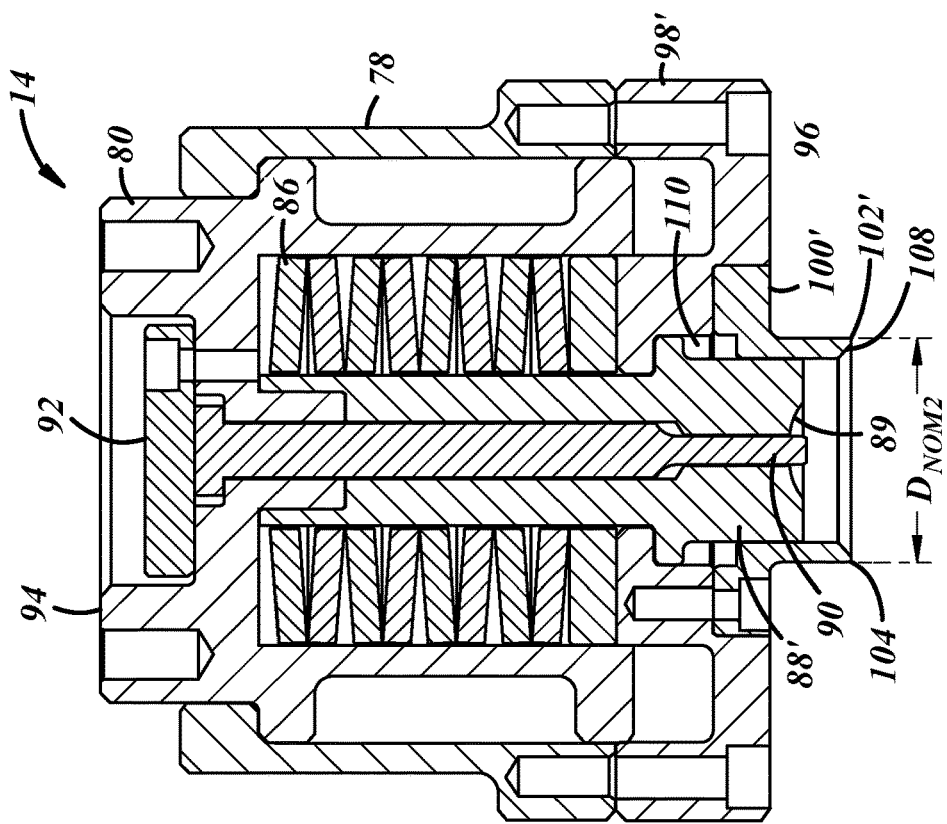
FIG. 4 is a cross-section view of the tool of FIG. 1.
Figure 5:
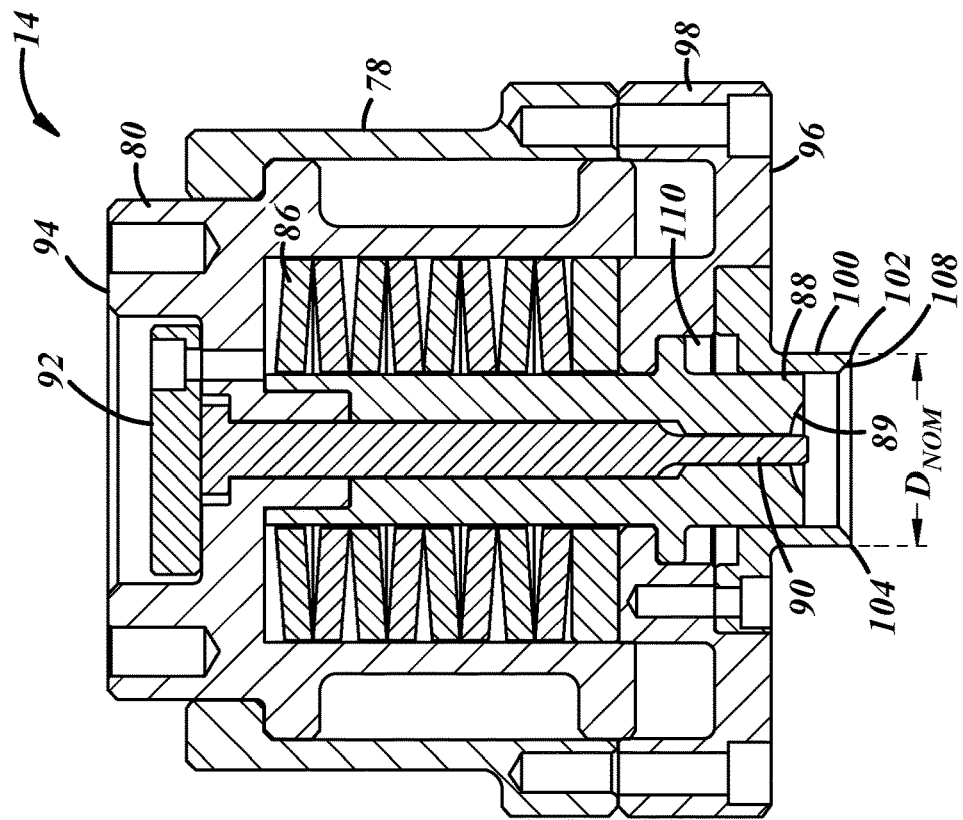
FIG. 5 is a cross-section view of the tool of FIGS. 1 and 4, with a radially expanded bearing seat and center punch for manufacturing an alternatively sized ball joint.

The tool 14, as shown in FIGS. 1, 4, and 5, is connected to a hydraulic or otherwise functional ram to press the cover plate 36 into place and seat the bearing 26 at the same time, as opposed to pre-pressing the bearing 26 into place in a separate operation. The tool 14 includes a casing 78 that at least partially surrounds a top press adapter 80. As shown in FIG. 1, a top locator 82 and ram connecter 84 can be included, with the top locator being screwed or otherwise attached to the top press adapter 80. A stack of Belleville washers 86 is nested between the top press adapter 80 and a center punch 88. Another spring form or hydraulic actuation can be used, but the Belleville washers 86 typically have a long lifetime, while allowing for flexibility and more precise control of the punches. The center punch 88 includes a domed internal segment 89 that generally surrounds a pin punch 90. A punch end cap 92 can be included toward a terminal end 94 of the tool 14. At a distal end 96 of the tool 14, opposite the terminal end 94, a bottom locator 98 is screwed or otherwise attached to the casing 78. The bottom locator 98 at least partially surrounds a bearing seat 100 which is also located at the distal end 96 of the tool 14. The bearing seat 100 at least partially surrounds the center punch 88 and the pin punch 90, and it may be screwed or otherwise attached to the bottom locator 98. The bearing seat 100 includes a projecting press extension 102 that axially extends from the distal end 96 of the tool 14. The projecting press extension 102 has a small planar tip end 104 that makes initial contact with an outer edge 106 of the cover plate 36, and a chamfered inner edge 108 can be included to help better create the domed profile 42 and strategically locate applied force. The bearing seat 100 and the bottom locator 98 together create an internal channel 110 to accommodate sliding movement of the center punch 88. A grease channel can also be included in the tool 14 that feeds grease through the pin punch 90, to fill the internal volume of the ball joint 12.

During manufacture, the bearing 26 and the other internal components of the ball joint can be freely dropped into the housing 28 without a separate pressing/seating operation for the bearing. Then, the pressure plate 34 and cover plate 36 are situated over the internal components, and the tool 14 is attached to apply a specific force to assemble the ball joint 12. The applied outside press force is accomplished using the tool 14 and varied with the use of the Belleville washers 86 within the tool, to control the loading force and location of that force. The initial force is used to lower the pin punch 90 into the grease hole 66. This helps keep the domed profile 42 from collapsing. The force is then directed through the bearing seat 100, and more particularly the projecting press extension 102, to seat the bearing 26 until the combined force of the Belleville washers 86 is overcome. The excess force is applied to compress and seat the cover plate 36, forming the domed profile 42, until maximum loading is achieved. During compression of the cover plate 36, pressure is first applied to the outer edge 106 via the projecting press extension 102, particularly at the planar tip end 104 and then at the chamfered inner edge 108, to create the pressed portion 50 and cause the outer perimeter 44 to enter the radial groove 38. Then, the center punch 88 presses around the domed portion 52, and the domed internal segment 89 helps create the center dome area 68. Once the cycle is complete, the dissipation of the applied force will allow the Belleville washers 86 to decompress, pulling the pin punch 90 out of the grease hole 66 in the cover plate 36.

FIGS. 4 and 5 illustrate an advantage of the tool 14, in that the center punch 88, the bottom locator 98, and the bearing seat 100 of FIGS. 1 and 4 can be replaced to accommodate manufacture of an alternatively sized ball joint 12. Accordingly, with the same casing 78, top press adapter 80, top locator 82, ram connector 84, pin punch 90, and possibly Belleville washers 86, a differently sized ball joint 12 can still be manufactured. FIG. 5 shows the tool 14 with a new center punch 88', bottom locator 98', and bearing seat 100'. This provides for a larger diameter bearing seat ($D_{NOM2}$), that can manufacture a larger diameter ball joint 12 than the tool 14 shown in FIGS. 1 and 4. The interchangeability of the components of the tool 14 can enhance manufacturing potential and allow for the production of alternatively sized parts and suspension components.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A ball joint, comprising: a ball;
a stud extending from the ball;
a bearing at least partially surrounding the ball;
a housing at least partially surrounding the bearing; and
a cover plate at least partially nested into the housing, wherein the cover plate includes:
a nested portion along an outer perimeter having a nested portion thickness,
a domed portion located radially inward of the outer perimeter having a domed portion thickness, and
a pressed portion located between the nested portion and the domed portion having a pressed portion thickness,
wherein the pressed portion thickness is less than the domed portion thickness when the nested portion is nested within a radial groove in an internal bore of the housing.

2. The ball joint of claim 1, wherein the pressed portion thickness is less than the nested portion thickness.

3. The ball joint of claim 1, wherein the domed portion includes a center dome area and a transition area, with the transition area being located adjacent the pressed portion.

4. The ball joint of claim 3, wherein a sloping transition wall is located in the transition area.

5. The ball joint of claim 4, wherein at least a portion of the sloping transition wall directly opposes an inner lip of the housing.

6. The ball joint of claim 1, wherein a radially extending width of the pressed portion is equal to or less than a radially extending width of the bearing.

7. A method of manufacturing a ball joint, comprising the steps of:
  inserting a bearing and stud into an internal bore of a housing;
  placing a cover plate on an open end of the housing adjacent a radial groove in the internal bore of the housing;
  pressing an outer edge of the cover plate to seat the bearing in place within the internal bore of the housing, wherein after pressing, the cover plate comprises a nested portion along an outer perimeter, a domed portion located radially inward of the outer perimeter, and a pressed portion between the nested portion and the domed portion, wherein the pressed portion has a thickness less than a thickness of the domed portion and the nested portion is nested within the radial groove.

8. The method of claim 7, further comprising the step of pressing a pin punch to retain a grease hole.

9. The method of claim 7, further comprising the step of pressing a domed portion of the cover plate after seating the bearing.

10. A tool for manufacturing a ball joint comprising a housing with a radial groove on an internal bore thereof, and a cover plate enclosing an end of the housing adjacent the radial groove, the tool comprising:
  a bearing seat having a projecting press extension that axially extends from a distal end of the tool, the projecting press extension configured to press the cover plate, so as to cause an outer perimeter of the cover plate to become radially nested within the radial groove, the outer perimeter comprising thereafter comprising a pressed portion having a decreased thickness, and
  a center punch, wherein the bearing seat at least partially surrounds the center punch and the projecting press extension axially extends beyond a distal end of the center punch.

11. The tool of claim 10, comprising a pin punch that is at least partially surrounded by the center punch.

12. The tool of claim 11, wherein the pin punch is configured to accommodate a grease hole.

13. The tool of claim 10, comprising a casing at least partially surrounding the center punch.

14. The tool of claim 13, comprising a second bearing seat having a radially expanded projecting press extension, wherein the bearing seat and the second bearing seat are removably interchangeable with respect to the casing.

15. The tool of claim 10, wherein the projecting press extension has a planar tip end and a chamfered inner edge.

16. The tool of claim 10, wherein the bearing seat creates an internal channel to accommodate movement of the center punch.

* * * * *

UNITED STATES PATENT AND TRADEMARK OFFICE
CERTIFICATE OF CORRECTION

| | |
|---|---|
| PATENT NO. | : 11,708,852 B2 |
| APPLICATION NO. | : 17/359595 |
| DATED | : July 25, 2023 |
| INVENTOR(S) | : Stephanie N. Niesen et al. |

It is certified that error appears in the above-identified patent and that said Letters Patent is hereby corrected as shown below:

On the Title Page

Item (73) "Federal-Mogul Motorspots LLC" should be changed to "Federal-Mogul Motorparts LLC".

Signed and Sealed this
Nineteenth Day of September, 2023

*Katherine Kelly Vidal*

Katherine Kelly Vidal
*Director of the United States Patent and Trademark Office*